Dec. 13, 1966  L. ALTMAN ETAL  3,290,944
REMOTE TEMPERATURE MEASURING APPARATUS
Filed Jan. 24, 1964

INVENTORS
LAWRENCE ALTMAN
DONALD GERTZ
WILLIAM F. SEIBOLD
CHARLES P. PATTERSON

United States Patent Office 3,290,944
Patented Dec. 13, 1966

3,290,944
REMOTE TEMPERATURE MEASURING
APPARATUS
Lawrence Altman, New York, and Donald Gertz, Carle Place, N.Y., William F. Seibold, Arnold, Md., and Charles P. Patterson, Arlington, Va., assignors, by direct and mesne assignments, to the United States of America as represented by the United States Atomic Energy Commission
Filed Jan. 24, 1964, Ser. No. 340,115
1 Claim. (Cl. 73—368)

The present invention relates to the remote instrumentation of a vessel and more particularly, to the remote instrumentation of a vessel utilizing acoustical sensing techniques for measuring temperature.

The development of the nuclear reactor has created a great deal of interest in devices which are capable of instrumenting the interior of a closed vessel with respect to such conditions as liquid level, temperature, and pressure, as well as others. The presence within the vessel of radioactive materials makes it most desirable to minimize the possibility of leakage from the vessel at locations where instrumentation leads pass through the vessel wall and where it is thus necessary to gain entry for maintenance and other service at intervals. Even though sophisticated seals are developed and utilized, in time there is apt to be a deterioration of materials and there is increased possibility that some leakage will occur.

In addition, it is well known that instrumentation of a nuclear reactor represents a substantial portion of the capital costs and is a major item in maintenance, spare parts, calibration, training, and downtime resulting from instrumentation failure.

In a pressurized water reactor, instrumentation includes sensing devices within the reactor vessel to monitor such conditions as pressure, temperature, and liquid level. It is necessary, of course, in conventional arrangements to transfer the developed signals by way of leads through openings provided in the vessel wall. Aside from the possibility of leaks which can develop in such a construction, the failure of some of the sensing devices within the vessel presents difficult problems of maintenance. In addition, the sensing signals produced are usually analog in nature so that background noise, power supply variations, calibration uncertainties and instrument drift quite often interfere with the accuracy of the readings. Also, an analog signal is not compatible with modern digital control systems so that additional expensive equipment is required to convert the information into digital form.

Thus it has long been felt in the nuclear power reactor art and in other areas where the need has appeared that simplified and more reliable measuring devices are required, especially those which can produce the desired information directly in digital form and can avoid contamination from the contents of the nuclear reactor or other containment vessels. The best types of measuring devices would be those which are externally mounted but are capable of sensing the various conditions within the reactor vessel and can produce the information in digital form. Devices of this nature would be relatively unaffected by environmental changes and power supply variations, not subject to drift, and would be easy to maintain since the units are replaceable without opening the reactor vessel.

While the example of the nuclear reactor emphasizes the need for such types of instrumentation, it is also true that equipment of this type would be useful wherever and whenever the convenience and safety of this type of instrumentation is desirable such as in general process plants, petroleum plants, fuel tanks, etc.

Efforts have been made to adapt acoustical techniques to the satisfaction of this need, as evidenced by U.S. Patent 3,100,885 dated August 13, 1963, which relies on liquid-air or liquid-gas interface to reflect the sound waves introduced in the liquid from outside the vessel. However, while arrangements of this type represent substantial improvements in the art, they do not solve the problem of temperature measurement and, also, further improvements are possible in accordance with this invention to improve the nature of the signal output so as to be digital in form. This output is then suitable for direct utilization in modern digital information computers and eliminates a possible ambiguity which could occur with reliance solely on the liquid-air or liquid-gas interface as a contact surface.

The present invention meets the requirements set forth above for improved instrumentation of nuclear reactors and other devices by offering apparatus and a method capable of sensing temperature of a fluid within a vessel by an external arrangement of liquid level measurement which produces the information directly in digital form.

Measurement of liquid level is covered in U.S. application Serial No. 331,634 filed on December 18, 1963, in the name of Altman et al., now Patent No. 3,214,974. In this invention a probe within the vessel is utilized to sense temperature and this information is transmitted to a stillwell on which an acoustical transducer is mounted externally to inject sound pulses into the liquid medium in the stillwell. These pulses are reflected by a stepped device within the liquid to indicate the level of liquid which is adjusted by the probe in accordance with the temperature of the fluid within the pressure vessel. The information is produced directly in digital form due to the stepped reflector and is usable directly in digital systems.

It is thus a first object of this invention to provide an arrangement for measuring fluid temperature within a closed vessel.

A further object of this invention is the application of remote sensing of liquid level to the measurement of fluid temperature within a vessel and the direct production of this information in digital form.

Still another object of this invention is the remote measurement of temperature of a fluid within a vessel through the use of acoustical transmitting and receiving devices.

Other objects and advantages of this invention will hereinafter become obvious from the following description of a preferred embodiment of this invention taken with the accompanying drawing in which.

Figure 1:
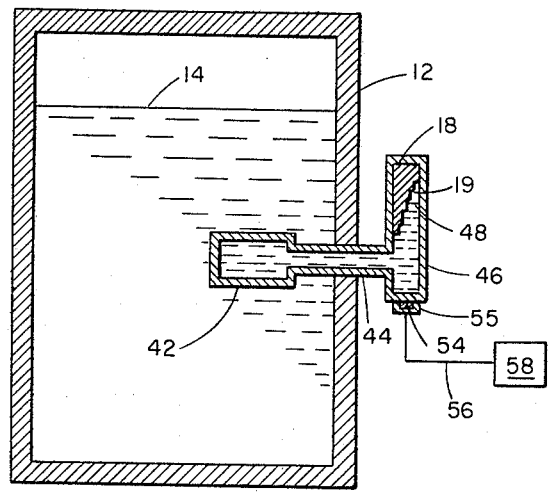
FIG. 1 is an elevation view in section of a vessel provided with a preferred embodiment of this invention for the measurement of fluid temperature.

Referring to FIG. 1 there is shown closed vessel 12 containing water 14. Submerged within water 14 is a sealed heat exchanger sensing element or probe 42 connected by way of a conduit 44 to an acoustical standpipe 46 so that a closed system is maintained between element 42 and standpipe 46. Filling element 42 and standpipe 46 to a level 48 is a suitable acoustically transparent liquid such as a high temperature silicone liquid which exhibits a linear temperature coefficient of expansion. Standpipe 46 has mounted within it a spiral stepshaft reflector 18 which is acoustically in line with an externally mounted transducer 54 in a holder 55 located on the bottom surface of standpipe 46. Transducer 54 sends out a pulse up through standpipe 46 and the silicone fluid towards stepshaft 18 where the submerged steps provide reflected pulses. The level of the silicon fluid within standpipe 46 is dependent on the temperature within element 42 and thus the number of return pulses is a measure of the temperature of liquid 14 in vessel 12. Transducer 54 is connected by way of lead 56 to driving and receiving circuits 58. Transducer 54 is a piece of material exhibiting the well known piezoelectric effect, that is, it is capable of converting an electrical pulse to a pulse of ultrasonic energy, and vice versa. An example of such a material is lead zirconate titanate. The driving and receiving circuits 58 are conventional circuits designed to initiate and receive electrical pulses. Typical circuits are described in the report NYO 10601 (FIGS. 6.2.12 and 6.3.3) issued by the U.S. Atomic Energy Commission. Such circuits are also commercially available.

Heat exchanger sensing element 42 may be designed as is undertood in the art for the most efficient transfer of heat from water 14 to the silicone liquid therein, including the use of fins, spiral coils shape, etc. To minimize the effect of temperature change of the fluid within standpipe 46, the fluid volume within the latter should be kept relatively small, as for example about 10% by volume of the total silicone fluid.

In the operation of the level indicating apparatus, transducer 54 issues a sound pulse in response to an electrical pulse which travels through water 14 until reaching stepshaft 18. Each of the separate steps 19 below the upper surface of water 14 produces a reflected sound pulse. Due to the uniform area of the steps, the reflected pulses are of substantially the same amplitude and return to transducer 54 at predetermined time intervals. In certain instances it may be desirable to have steps of non-uniform depth whereby transmitting pulses in non-uniform time intervals. The number of pulses returning will be a direct indication of where the liquid appears on stepshaft 18 as the sound waves do not pass through the surface of liquid 14 and only the immersed steps 19 produce reflected pulses.

Figure 2:
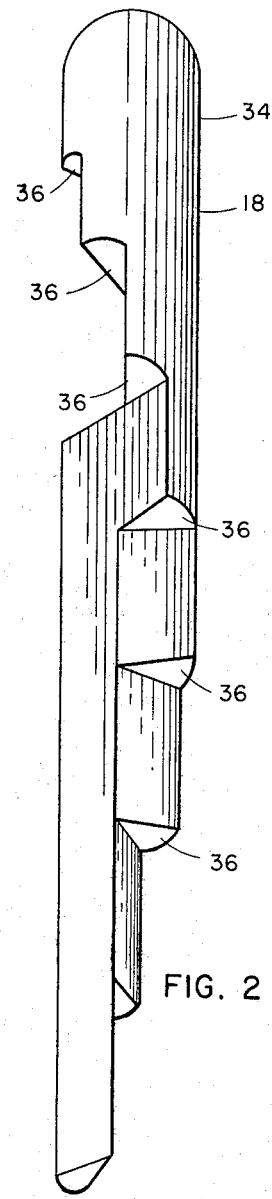
FIG. 2 is an isometric view of the step shaft reflector.

While stepshaft 18 has been shown in FIG. 1 only schematically, reference is made to FIG. 2 for details of the design. There it will be seen that stepshaft 18 may be machined from a cylindrical member 34 from which a plurality of spirally-arranged wedge shaped steps 36 are cut, so that stepshaft 18 occupies a minimum of space.

Bonding of the transducer crystal to the outer surface of the vessel described above can be accomplished either by the use of metal bearing electrically conductive epoxies or alloy solders. In using an epoxy, the crystal is clamped to the wall by suitable means with a layer of epoxy in between and heat supplied to cure the epoxy. Care must be exercised to remove all air bubbles, and this may be facilitated by curing the epoxy in a vacuum to help eliminate the air bubbles. A suitable solder is the lead-tin eutectic with 2% silver. The alloy solder technique was successfully tested at 435° F. and was applied using the same procedure followed in the case of the epoxy.

For conditions in which the above bonding techniques might not be convenient, as under emergency replacement of a transducer, a so-called dry bonding technique has proved to be satisfactory. This technique employs optical flat mating surfaces and use of pressure to obtain the required intimacy of contact.

With regard to the acoustically reflective stepshaft, described above, the surfaces of the steps which are parallel to the transducer are arcs of circles. Experimental evidence indicates that equal areas reflect approximately equal amounts of ultrasonic energy even though each step is at a different distance from the transducer. This was noted to be true over lengths of 3 feet or less for water since attenuation in the latter is small.

Experiments were conducted on the stepshaft to determine its limiting or critical conditions. It was found that the nature of the step surface, i.e., rough or smooth, did not effect significantly the sharpness or size of the reflected pulses. However, surfaces inclined only slightly i.e. 7°, away from the transducer reflected only a small amount of energy to the transducer so that the surfaces should be substantially parallel to or facing the transducer. Corrosion of the surfaces likewise did not affect the shaft performance.

In addition, a crystal frequency of about 4 mc. was found to be best for applications of medium range and resolution in water. Higher frequencies attenuate too rapidly while lower frequencies produce less sharply defined reflections. A crystal diameter slightly greater than stepshaft diameter provided superior results. For example, a stepshaft diameter of 1.85 inches was used with a 2 inch diameter crystal with excellent results.

Experiments with both a solid state driver and a vacuum tube ultrasonic generator showed that input power and voltages were not critical factors. Reduction of driver voltage by 50% resulted in approximately a 10% reduction in reflected signal, with no effect on signal sharpness, so that the amount of power used is not a critical factor except that sufficient power should be used to obtain the desired amplitude or reflected pulses.

It has already been noted that signal magnitude is directly related to the reflecting step area. Doubling the segment angle of a step, approximately doubles the magnitude of the signal. Regarding the mechanical alignment of the stepshaft, this is important but not critical. Alignment was found to be relatively easy for short stepshafts i.e. 18 inches in length or less, and more difficult for long stepshafts of the order of 3 feet or more, as would be expected. Good results have been obtained using a 3 foot long, 1.85 inch diameter stepshaft with 9 equally spaced steps, pulsed by a 2 inch diameter 4 mc. crystal bonded on a 0.265" stainless steel wall.

It is thus seen that there has been provided a unique approach to the remote sensing of temperature within a closed container and the direct production of the information in digital form. While a preferred embodiment of this invention has been described it is understood that the scope of the invention is to be limited only by the appended claim.

We claim:

Temperature measuring apparatus for connection to a main vessel containing a fluid, comprising sensing means located in said fluid within said vessel, a conduit open to said sensing means extending out through the wall of said vessel, a vertically extending auxiliary vessel having a bottom surface and having said conduit open thereinto adjacent said bottom surface, a temperature responsive liquid filling said sensing means, said conduit, and partially filling said auxiliary vessel so that changes in temperature of said liquid within said sensing means will result in expansion and contraction of said liquid therein followed by changes in the level of said liquid in said auxiliary vessel, transmitting and receiving transducer means attached to the bottom surface of said auxiliary vessel for emitting a sound pulse through the vessel wall into said liquid, stationery reflector means partially immersed in said liquid within said auxiliary vessel, the latter said means having a series of vertically staggered reflective surfaces facing said transducer means for reflecting from the reflective surfaces located beneath the surface of said liquid the sound pulse arriving from said transducer means, the number of reflected sound pulses thereby indicating the level of said liquid within said auxiliary vessel and the temperature of said fluid in said main vessel.

References Cited by the Examiner
UNITED STATES PATENTS

| | | | |
|---|---|---|---|
| 2,993,378 | 7/1961 | Schratt | 73—371 |
| 3,074,275 | 1/1963 | Hobin | 73—371 |
| 3,214,974 | 11/1965 | Altman et al. | 73—290 |

LOUIS R. PRINCE, *Primary Examiner.*

D. McGIEHAN, *Assistant Examiner.*